United States Patent [19]

Loomer et al.

[11] Patent Number: 4,746,258
[45] Date of Patent: May 24, 1988

[54] FLOATING TABLE FOR ARTICLE TRANSPORT VEHICLE

[75] Inventors: Weston R. Loomer, Florence; Randall P. Coons, Fort Mitchell, both of Ky.

[73] Assignee: Litton Systems, Inc., Del.

[21] Appl. No.: 775,633

[22] Filed: Sep. 13, 1985

[51] Int. Cl.$^4$ ............................................. B65G 67/02
[52] U.S. Cl. ................... 414/401; 414/749; 414/222; 414/349; 414/584; 104/48
[58] Field of Search ............. 414/401, 343, 679, 349, 414/354, 346, 222, 373, 383, 402, 572, 573, 584, 749, 750; 180/167, 168, 169; 104/48, 49

[56] References Cited

U.S. PATENT DOCUMENTS

| | | | |
|---|---|---|---|
| 1,694,913 | 12/1928 | Fitch | 414/347 |
| 2,123,424 | 7/1938 | Kellett | 414/343 |
| 3,666,118 | 5/1972 | Raynes et al. | 414/401 |
| 3,710,524 | 1/1973 | Seiz | 414/401 X |
| 3,796,327 | 3/1974 | Meyer et al. | 414/401 X |
| 3,998,340 | 12/1976 | Westwood | 414/401 X |
| 4,328,545 | 5/1982 | Halsall et al. | 180/167 X |
| 4,345,662 | 8/1982 | Deplante | 180/168 |
| 4,363,587 | 12/1982 | Rooklyn | 414/401 |

FOREIGN PATENT DOCUMENTS

| | | | |
|---|---|---|---|
| 927571 | 5/1963 | United Kingdom | 414/401 |
| 276703 | 7/1970 | U.S.S.R. | 414/749 |
| 301159 | 4/1971 | U.S.S.R. | 414/401 |

Primary Examiner—Frank E. Werner
Attorney, Agent, or Firm—Morris I. Pollack

[57] ABSTRACT

A guided vehicle, which follows a guidepath into and out from a work station, is provided with an article carrying table that includes a plurality of cone shaped mounting plates each disposed upon a ball transport unit to provide for relative movement between the article carrier, any article carried thereby, and the body of the vehicle. Each side, of two opposed sides, of the article carrier mounts a number of guide wheels; including entry guide wheels larger in diameter than side guide wheels, with the entry wheels disposed proximate carriers of the carrier and side wheels disposed therebetween. Guide rails disposed at the work station cooperate with the guide wheels to effect relative movement between the article carrier and vehicle body if the vehicle enters the work station out of a centered alignment therewith. A number of position limit rods extend up from the vehicle body through openings in the article carrier so that the sides of the rods cooperate with the walls of the openings to limit side to side and front to back relative movement. Caps are provided on top of the rods for cooperation with the article carrier to limit vertical movement thereof relative to the vehicle body. The mounting of the carrier on the vehicle body is such that the effect of gravity returns the article carrier to a vehicle centered position when the vehicle leaves the work station.

9 Claims, 3 Drawing Sheets

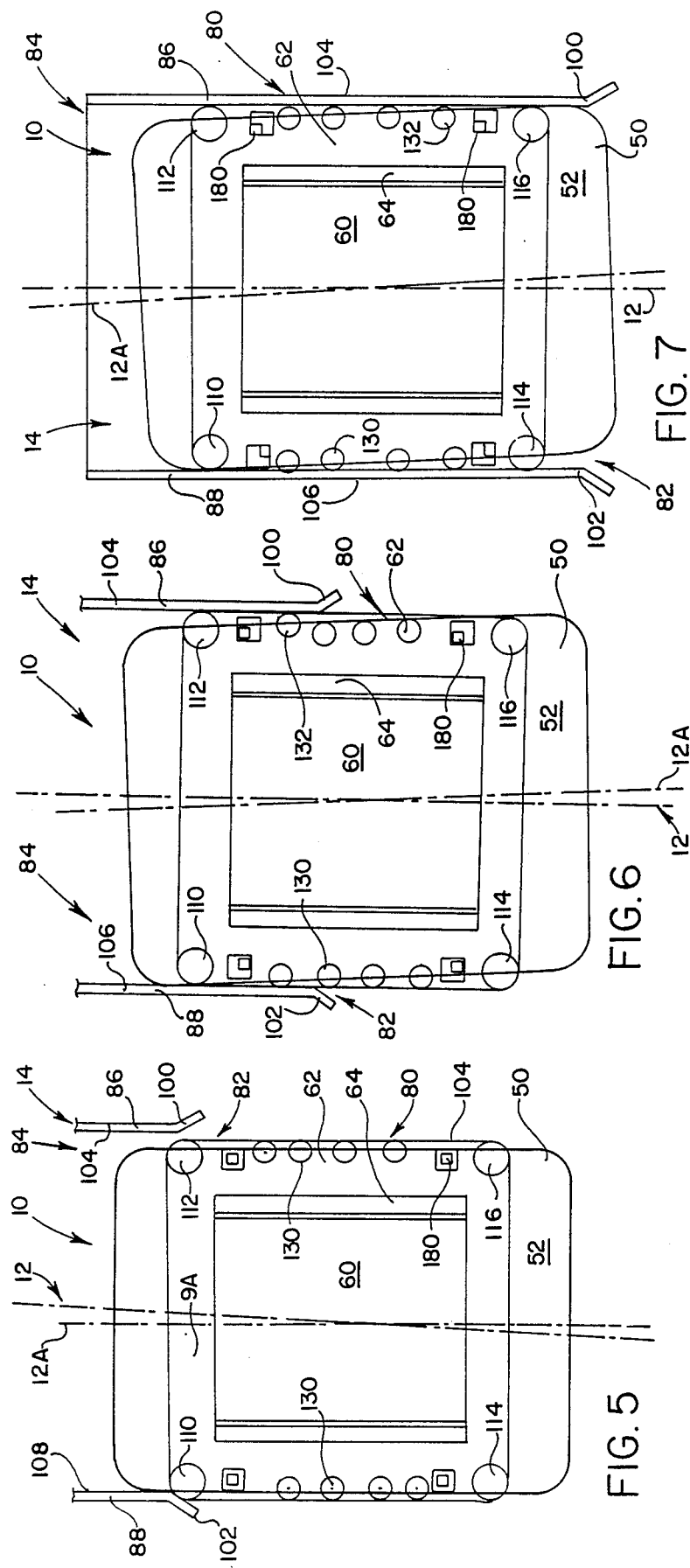
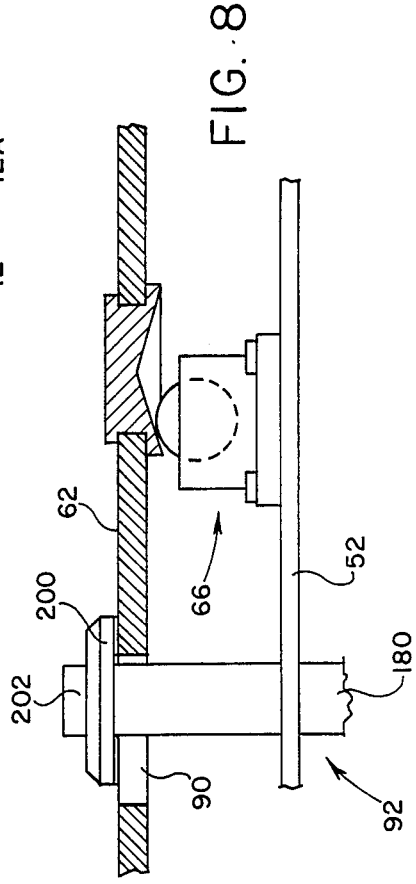
FIG. 5  FIG. 6  FIG. 7  FIG. 8

FLOATING TABLE FOR ARTICLE TRANSPORT VEHICLE

BACKGROUND OF THE INVENTION—FIELD OF APPLICATION

This invention relates to article transport vehicles; and more particularly, to article carrying tables for article transport vehicles.

BACKGROUND OF THE INVENTION—DESCRIPTION OF THE PRIOR ART

Transport vehicles, and more particularly guided transport vehicles and automated guided vehicles, may be constructed to move along selected paths carrying articles of many types and descriptions. In many instances such vehicles need only stop at a location while articles, such as mail, are removed from the vehicle or deposited onto the vehicle. The vehicle then proceeds to its next stop or work location. Other such guided vehicles may be utilized for heavier articles such as work in process, tools, or the like. Such vehicles move work in process, and/or tools, between machining centers, to and from storage, and perform similar transport tasks. If the article being transported is relatively heavy, lifting equipment may have to be provided to help remove articles from the vehicle or place articles upon the vehicle for guided vehicles which merely stop proximate the delivery location. For lighter articles the operator may do the lifting. Other guided vehicles have article carrying tables which incorporate mechanism to raise and lower the article being carried to facilitate depositing the article onto a receiving location or removing the article therefrom.

Some automated guided vehicles follow a chemical guidepath provided between locations where the vehicle is stopped to receive articles or have articles removed therefrom; while other such vehicles follow a wire embedded within or disposed upon the surface upon which the vehicle moves. Still other such guided vehicles follow paths dictated by infra-red or radio waves, lasers or the like. Ideally, vehicles being so guided align a center line of the vehicle, or its article carrying deck or table, with a guidepath center-line. However, in many instances the vehicle center-line merely approaches or follows close to one side or the other of the guidepath center-line. When the vehicle reaches its various locations its center-line may thus be aligned or not with the guidepath center-line; and in many instances may not be so aligned.

Alignment of the vehicle center-line, or more particularly the center-line of the article carrier and article carried thereby, with the guidepath center-line is not necessarily critical in installations where the vehicle stops transport movement proximate the work storage location and other means (operator and/or lifting equipment) are used to load or unload the vehicle. However, such alignment becomes critical when the transport vehicle must move into a defined position and, when so positioned, automatically deposit or receive a load, or position its load for an automatic operation or for automatic location of an article to be deposited thereon or removed therefrom. If the vehicle article carrier or table is not properly aligned in such circumstances the vehicle may fail to enter the location to deposit its load. Should a vehicle with an improperly located article or load be able to enter the vehicle stop location then further processing of the load may be either impossible or improperly accomplished. For example, if the load is to be deposited upon a conveyor, or located for automatic pick-up by automated conveying equipment, but is improperly aligned then such pick-up or further conveying may be impossible to accomplish, or may result in damage to the load, conveyor or both. Similarly, if the guided vehicle carried load is to be positioned so that a particular item is to be removed from a particular load location, or is to be deposited at a particular load location, by automated means (such as a robot) improper load positioning could result in improper processing of the item. Improper positioning of a load carried by a guided vehicle into a station where work is to be automatically performed at a particular location on the load (such as a robot effected machining, assembly, or similar operation) may result in failure to accomplish the operation or an operation incorrectly accomplished with resultant damage or destruction of the load, robot, or both. Alternatively, an article deposited on a vehicle improperly aligned may fall off the vehicle when the vehicle begins its transport, or the article and vehicle may both topple; possibly damaging the vehicle and/or article. In addition, an article improperly re-deposited upon the vehicle may hinder further article processing at subsequent work locations, render same impossible altogether, or result in damage to the article, vehicle or both.

SUMMARY OF THE INVENTION

It is therefore an object of this invention to provide a new and improved article transport vehicle.

It is another object of this invention to provide a new and improved automated guided vehicle.

It is yet another object of this invention to provide a new and improved article carrier or table for an article transport vehicle.

It is still another object of this invention to provide a new and improved article carrier or table for an automated guided vehicle.

It is yet still another object of this invention to provide a new and improved article carrier or table for an article transport vehicle which is mounted to the vehicle to permit relative or floating movement between the article carrier and vehicle.

It is a further object of this invention to provide a new and improved article carrier or table for an automated guided vehicle in which the article carrier or table is mounted upon the vehicle to permit relative floating movement therebetween while restricting such movement to defined limits.

This invention involves article transport vehicles; and more particularly such vehicles of the automated guided type; and which include a vehicle base and an article carrier or table carried by the vehicle base. It contemplates mounting the article carrier or table upon the vehicle base to permit relative, floating-type, movement between the article carrier or table and vehicle base for the purpose of facilitating alignment of the article carried by the carrier or table with a selected vehicle stop location which might otherwise be out of alignment W with the vehicle. The invention further contemplates mounting the article carrier or table upon the vehicle in such a way as to restrict the relative, floating-type, movement within predetermined limits; and in such a way that the article and its carrier or table are re-centered upon the vehicle base for transport movement.

Other objects, features, and advantages of the invention in its details of construction and arrangement of parts will be seen from the above, from the following description of the preferred embodiment when considered with the drawing and from the appended claims.

BRIEF DESCRIPTION OF THE DRAWING

In the drawing:

FIG. 5 is a schematic plan view of the vehicle and the drop-off/pick-up station of FIG. 1 showing their relative positions upon entry of the vehicle into the station;

FIG. 6 is a schematic plan view similar to FIG. 5 but showing the vehicle after it has moved further into the station;

FIG. 7 is a schematic plan view similar to FIGS. 5 and 6 but showing the vehicle fully moved into the station; and FIG. 8 is a partial sectional view of a portion of the structure for mounting the article carrier or table to the vehicle base.

DESCRIPTION OF THE PREFERRED EMBODIMENT

For convenience, the invention will be described as applied to a transport vehicle of the automated guided type which follows a wire guidepath and which includes an article carrying table that may be raised and lowered to deposit and pick-up an article at a drop-off/pick-up station associated with a machining center of the flexible machining system (FMS) type. It should be understood, nevertheless, that without departing from the invention that the vehicle may be any appropriate type of article transport vehicle; that it may follow a chemical, laser, radio-wave or other type of guidepath, or be guided n its movement by any suitable means, that its article carrier or table may move other than to raise and lower the article or it may not move at all, and that the vehicle may coact with and deposit or receive its article from any suitable location such as a storage location, work station, conveyor pick-up or drop-off station, or similar location.

Figure 1:
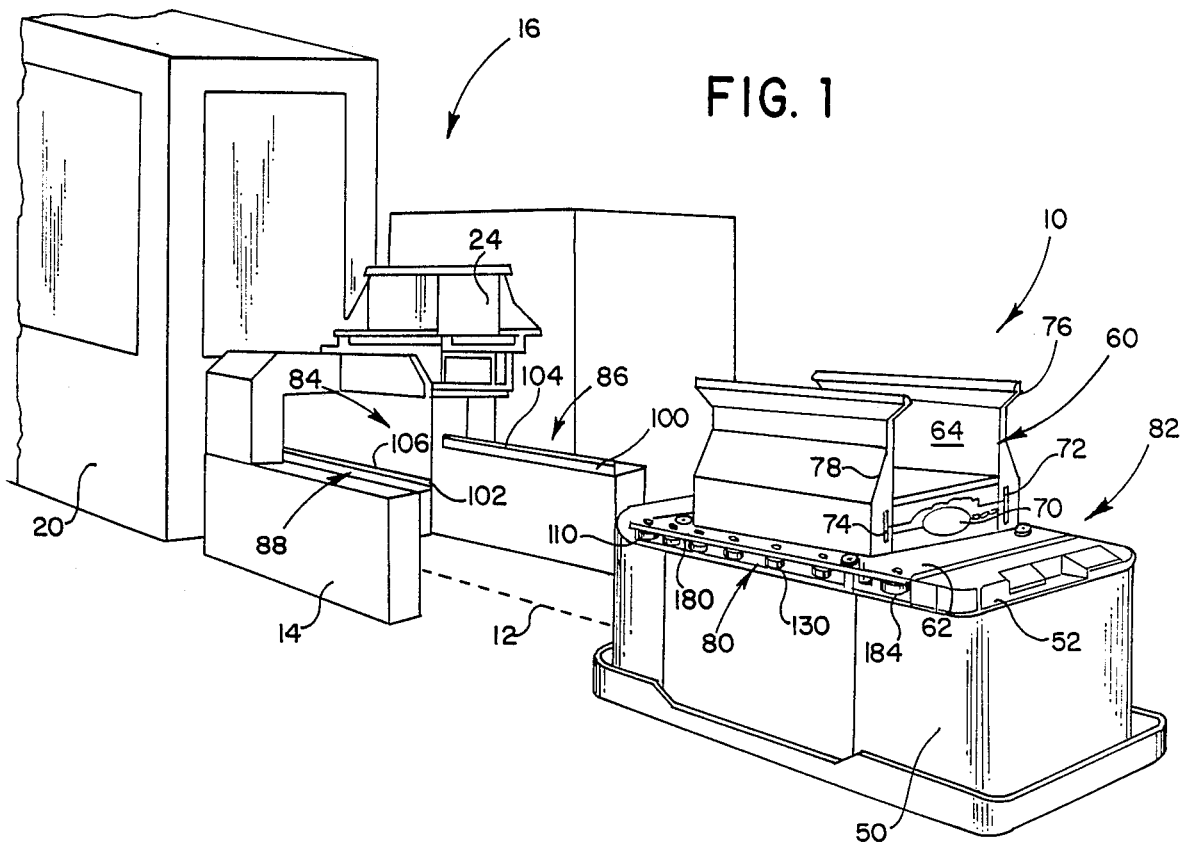
FIG. 1 is a perspective schematic showing of a work location (such as a machining center) showing a transport vehicle (in the form of an automated guided vehicle) incorporating the instant invention.

With reference to FIG. 1, there is generally shown at 10 an article transport vehicle of the automated guided type (AGV) which follows a guidepath 12 into and out from an article station 14 of a flexible machining system 16. Flexible machining system 16 may be of any conventional configuration, but in this instance includes a machining center 20 with robot/conveying means to automatically move an article 24 from station 14 into machining center 20 so that one or more machining operations may be performed upon article 24. After the machining operations have been performed on article 24 it is returned by the robot/conveying means to station 14 for pick-up by vehicle 10. It should be understood that vehicle 10 may just as easily cooperate with an article station disposed to provide or receive a tool carrier from which tools are provided to machining center 20 or from which tools utilized by machining center 20 are received, or an article station associated with a storage system, or for that matter, any appropriate article station or location, or a location at which work is performed directly upon the article, or any other automated operation is accomplished.

Vehicle 10 is of the automated guided vehicle (AGV) type which is powered by electric batteries and receives control commands from a central computer by radio signal or the like. It follows, in this instance, an excited, or excitable wire guidepath 12 embedded into the floor upon which vehicle 10 moves. Vehicle 10 may just as well follow a chemical, laser, radio-wave, or other guidepath or it may be otherwise guided in its travels. Vehicle 10 furthermore may be powered by any suitable motive means; and except for the hereinafter described invention is of conventional construction and drive.

Figure 4:
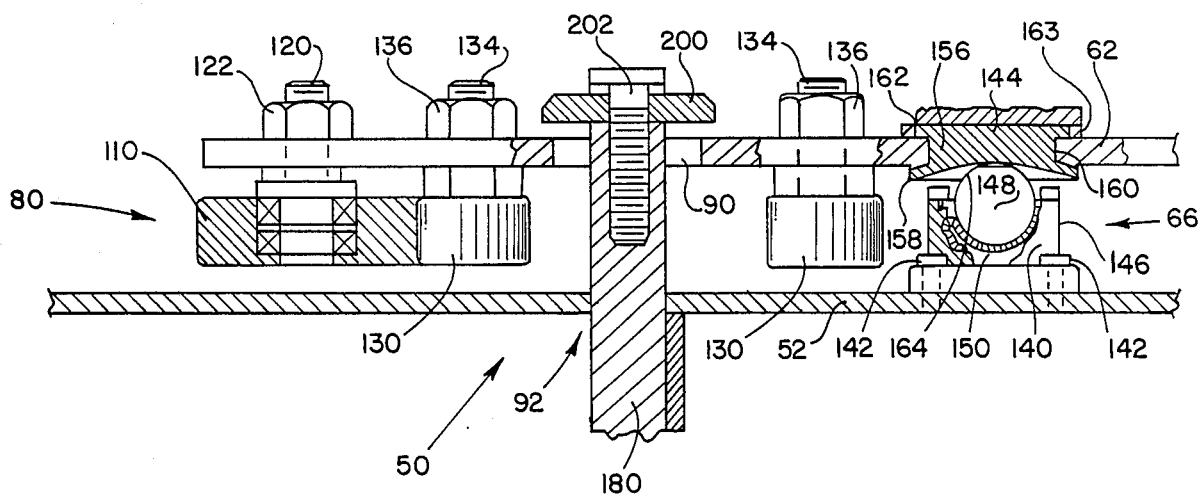
FIG. 4 is a partial sectional view of a portion of the vehicle of FIGS. 1-3 showing details thereof.
Figure 2:
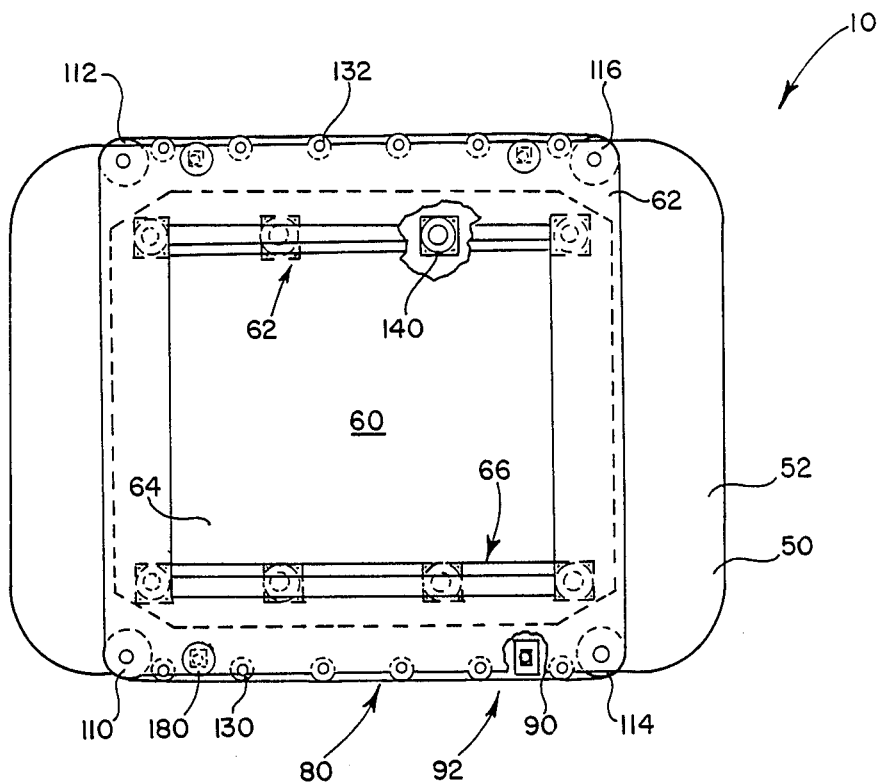
FIG. 2 is a plan view of the vehicle of FIG. 1 with parts cut away to better show details thereof.
Figure 3:
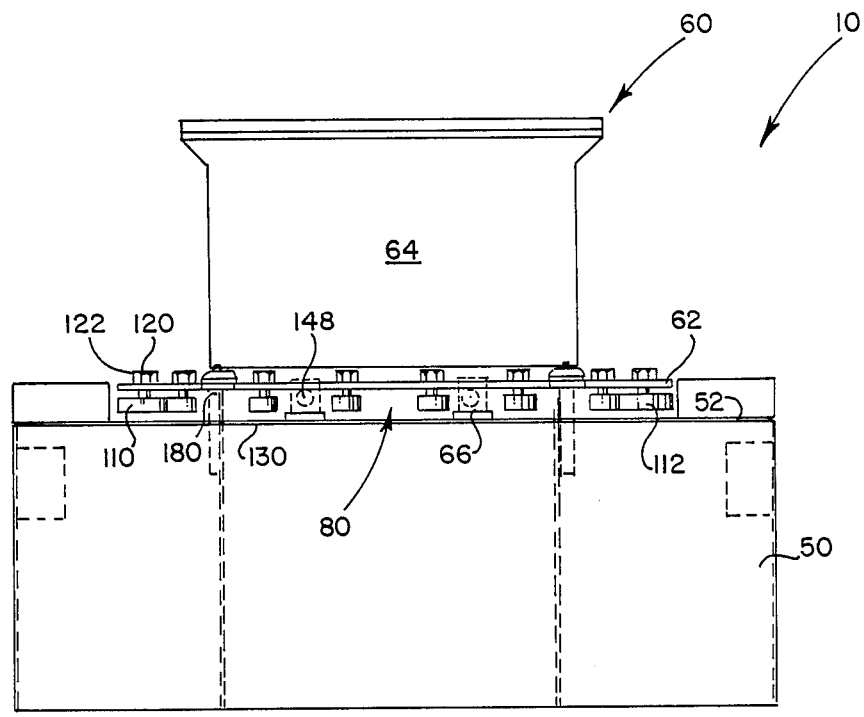
FIG. 3 is a vertical elevational view of a portion of the vehicle of FIGS. 1 and 2.

A vehicle body 50 houses the motive power and other control mechanisms and devices of vehicle 10 and mounts wheel assemblies (not shown) to enable vehicle 10 to follow guidepath 12 and move therealong. Such motive power and control mechanisms are of conventional construction. A deck, or top plate, 52 forms a top for vehicle body 50. An article carrier assembly or table 60, including a base plate 62 and an article carrier 64 are mounted to vehicle base 50 by way of a table mounting structure 66 (FIGS. 2-4). Carrier 64 includes suitable power means such as a motor 70 (FIG. 1) and ball screws 72, 74 (of conventional construction) to effect controlled raising and lowering of side supports 76, 78 of carrier assembly 60 and any article 24 carried or to be received thereby. Other suitable and appropriate means may be provided to raise and lower carrier assembly 60.

Carrier base plate 62 mounts a wheel portion 80 of a table guide structure 82 for which a guide rail portion 84 (FIGS. 1 and 5) thereof is carried by article station 14. Carrier base plate 62 furthermore is provided with a number of position limit control openings 90 (FIGS. 2 and 4) which form part of table position control structure 92 other components of which are carried by vehicle base 50 as will be hereinafter explained.

A pair of opposed guide rails 86, 88 constituting guide portion 84 of guide structure 82, are mounted in opposed spaced relationship at article station 14. Each rail 86, 88 includes a flared out entry position 100, 102 respectively and relatively straight side portions 104, 106 respectively, all of a length and height to facilitate cooperation with guide wheel portion 80 of carrier 60 in all of its relative positions with respect to vehicle base 50. Rail portions 84 are suitably secured in place at an appropriate location at article station 14.

Wheel portion 80, includes four entry wheels 110, 112, 114, and 116 (FIG. 5) of guide structure 82, each mounted proximate a corner of base plate 62 for rotation about a stub shaft 120 (FIG. 4) secured in place to plate 62 by a suitable means such as a hex nut 122. A plurality of side guide wheels 130 are mounted along the side of plate 62 between entry wheels 110, 114 (FIG. 2) while a similar plurality of side guide wheels 132 are mounted along the side of plate 62 between entry wheels 112, 116. Side guide wheels 130, 132 are each mounted for rotation upon stub shafts 134 (FIG. 4) secured to base plate 62 by suitable mounting means such as hex nuts 136. The number of side guide wheels 130, 132 will depend upon the length of plate 62 and other design criteria but in this instance four such guide wheels 130 and four wheels 132 are utilized along each side respectively of plate 62. The mounting for side guide wheels 130, 132 and entry guide wheels 110-116 is such as to dispose the outer surfaces thereof for cooperation with guide rails 86, 88 respectively. The diameter of entry guide wheels 110-116 is selected, in this instance, to be larger than the diameters of side guide wheels 130, 132; but other size relationships may be utilized.

Thus, as vehicle 10 moves along guide path 12 it may be attempting to follow exactly upon guidepath 12 but in actuality moving along an actual path of movement 12A (FIGS. 5-7). As such, upon entry of vehicle 10 into article station 14 one of its entry guide wheels 110-116 (in this instance 110—FIG. 5) will engage flared end 100 of left side guide rail 88. As vehicle 10 travels further along actual path 12A (FIG. 6-FIG. 7) the cooperation of wheel 110 and side 106 of guide rail 88 will effect a movement of carrier or table 60 with respect to vehicle body 50 in the approximate direction of arrow A (FIG. 5) towards a position wherein table 60 will align with guide rails 86, 88 and move along guide path 12 even though vehicle 10 and its body 50 is actually moving along path 12A. As vehicle 10 continues to move along path 12A entry wheel 112 will coact with guide rail 104 and side guide wheels 132 will coact first with flared end 100 and thereafter side 104 of guide rail 86 to further effect movement of table 60 with respect to vehicle body 50 so that table 60, and any load carried thereby, will end up moving along guidepath 12 even though vehicle 10 and its body 50 continue to move along path 12A. Thus, when vehicle 10 comes to rest at station 14 it remains positioned along path 12A but table 60 and its article, such as article 24, is properly aligned; with wheels 110, 114 and wheels 130 engaged with rail 88 and with wheels 112, 116 and 132 engaged with rail 88. Further processing of article 24 at station 14 may then be undertaken because article 24 is thus properly aligned.

The relative floating movement of table 60 with respect to vehicle base 50 is facilitated by table mounting structure 66 with limits placed thereon by table position control structure 92.

Table mounting structure 66 includes a plurality of ball transfers 140 (FIGS. 2-4) secured to deck 52 of vehicle base 50 as by threaded members 142 (FIG. 4); each ball transfer 140 being disposed for cooperation with a mounting plate 144. In this instance four such ball transfer/mounting plate combinations are disposed along each side of vehicle base 50/carrier base plate 62 (FIG. 2). Each ball transfer 140 is of conventional construction and includes a cup shaped holding part 146 within which a support ball 148 is mounted for rolling action upon a plurality of ball bearing type balls 150. Other suitable and available ball transfer constructions may be utilized; and any suitable and appropriate number thereof secured between carrier 60 and vehicle 50.

Each mounting plate assembly 144 is formed with a substantially cylindrical body portion 156 with a substantially cylindrical lip portion 158 disposed at one end thereof. An opening 160, formed in plate 62 at each location where a mounting structure 66 is to be disposed, is formed of a size and configuration to receive body portion 156 so that lip portion 158 butts up against the underside of plate 62. A circumferential groove 162 surrounds body portion 156 proximate an upper end thereof and is formed of a size and configuration to receive a snap ring 163. When body portion 156 is disposed in opening 160, with its lip portion 158 butted against the underside of plate 62, groove 162 is disposed proximate upper surface of plate 62 so that disposition of snap-ring 163 in groove 162 firmly positions mounting plate 144 and secures mounting plate 144 to plate 62.

Each mounting plate 62 includes a cone-like concave support surface 164, of a size and of a configuration to cooperate with its respective support ball 148. Any suitable cone or cone-like surface configuration may be provided for mounting plate 62.

Support surfaces 164 cooperate with their respective support balls 148 to support table 60, and an article 24 when carried thereby, in all relative positions of table 60 with respect to vehicle base 50 induced by the cooperation of guide wheels 110-116 and wheels 130, 132 with guide rails 86, 88. Support surfaces 164 further cooperate with their respective support balls 148 to facilitate and effect movement of table 60, and an article 24, back into alignment with vehicle base 50 as wheels 110-116 and 130, 132 move out of cooperation with guide rails 86, 88. This is accomplished automatically and only due to gravitational affect upon table 62, and an article 24 if carried thereby.

Thus, it should be seen that forces will be generated to effect movement of table 60, and an article 24 when carried thereby, with respect to body 50 of vehicle 10. In the particular embodiment described herein the generated forces result from the movement of vehicle 10 into station 14 in an actual direction 12A different from guidepath 12 and the reaction forces from the resultant coaction between wheels 110-116, 130 and 132 with rails 86, 88.

Such relative floating movement of table 62 upon vehicle base 50 must, however, be limited in its side-to-side, front-to-back, and vertical extent. If not so limited, over-extended relative positions between table 60 and any article 24 carried thereby and vehicle base 50 could result in article 24 falling off vehicle 10 or toppling vehicle 10.

Table position control structure 92 (FIGS. 2 and 4) is provided to control and limit the extent of such side-to-side, front-to-back, and vertical movement of table 62 with respect to vehicle base 50; and combinations thereof. A number of control openings 90 are formed through base plate 62 of table 60. In this instance four openings 90 are provided one proximate each corner of plate 62. A position limit control rod 180, extending up from vehicle base 50 through each opening 90, is suitably secured to vehicle base 50. Each rod 180 is smaller in cross-section than the size of openings 90. The distance between the outer surface of the respective sides of rods 180 and the respective inner walls of openings 90 defining the permitted extent of movement therebetween. It is, of course, possible to have rods 180 of any suitable cross-sectional configuration (round, hexagonal, etc.) with openings 90 of corresponding cross-section or differing therefrom.

A position limit control cap 200 is disposed on top of each rod 180 and secured in place thereon by suitable means such as a threaded member 202. Each cap 200 is of any suitable configuration (in this instance round) and of a size that is larger than opening 90 so that the upper surface of base plate 62 will limit against a lower surface of cap 200.

It will thus be seen that as table 62 moves with vehicle base 50 between guide rails 86, 88 the cooperation between guide wheels 110-116 and side wheels 130, 132 and rails 86, 88 will move table 62 with respect to vehicle base 50 should vehicle 10 not be perfectly on guidepath 12. As base plate 62 moves with respect to vehicle base 50 mounts 144 will ride on balls 148 and plate 62 will shift with respect to position control limit rods 180 (FIGS. 5-7). Such shifting will be permitted until a side wall of a rod 180 moves against a side wall of an opening 90 and/or until the upper surface of base plate 62 moves against a cap 200. It is possible that full centering of table 62 may be accomplished without a rod 180 striking a side wall of an opening 90 or without movement of plate 62 against a cap 200. When vehicle 10 moves out from between guide rails 84 gravity will effect return of table 62 into a central position upon vehicle base 50.

From the above description it will thus be seen that there has been provided a new and improved guided vehicle and a new and improved article carrier or table for a guided vehicle; which table, when incorporated with the vehicle, provides a floating article carrier such that a force of predetermined magnitude and direction when applied to the table will move the table, and an article carried thereby, with respect to the vehicle body but within defined limits of movement. The floating arrangement so provided enables a vehicle otherwise unaligned with respect to a predetermined location at an article station to deliver an article thereto, position an article thereat or receive an article therefrom with an aligned disposition.

It will be understood that although I have shown the preferred embodiments of my invention that various modifications may be made in the details thereof without departing from the spirit as comprehended by the following claims.

What is claimed is:

1. A guided vehicle; comprising:
   (a) vehicle body means;
   (b) article carrier means carried by said vehicle body means for relative movement with respect to said vehicle body means but so as to occupy a predetermined position of predetermined alignment with respect to said vehicle body means;
   (c) carrier mounting means mounting said article carrier means to said vehicle body means for said relative movement with respect to said vehicle body means and so as to facilitate disposition of said article carrier means in said predetermined position of predetermined alignment;
   (d) said carrier mounting means including a predetermined number of ball transport means arranged in at least two parallel rows, each of said parallel rows being spaced from the other and including at least two of said ball transport means;
   (e) mounting means including a plurality of mounting plates carried by said article carrier means so that each of said mounting plates is disposed for coaction with one of said predetermined ball transport means;
   (f) said carrier mounting means being responsive to the application of generated forces to said article carrier means and/or to said carrier means to permit movement of said article means from said predetermined position of predetermined alignment to a position displaced therefrom; and
   (g) said carrier mounting means further upon removal of said generated forces automatically effecting movement of said article carrier means back to said predetermined position of predetermined alignment.

2. A guided vehicle; comprising:
   (a) vehicle body means;
   (b) article carrier means carried by said vehicle body means for relative movement with respect to said vehicle body means but so as to occupy a predetermined position of predetermined alignment with respect to said vehicle body means;
   (c) carrier mounting means mounting said article carrier means to said vehicle body means for said relative movement with respect to said vehicle body mean and so as to facilitate disposition of said article carrier means in said predetermined position of predetermined alignment;
   (d) said carrier mounting means including ball means including a predetermined number of ball transport means arranged in at least two parallel rows, each of said parallel rows being spaced from the other and including at least two of said ball transport means;
   (e) mounting means carried by said article carrier means for cooperation with said ball means; and
   (f) limit means including four rod means carried by said vehicle body means is spaced relationship one to the other, and four openings each of a predetermined size and configuration carried by said article carrier means each in spaced relationship one to the other and so that each one of said openings is so carried for disposition about a respective one of said rod means such that relative movement of said article carrier means is limited by movement of an inner wall of at least one of said openings against an outer wall of its respective rod means;
   (g) said carrier mounting means being responsive to the application of generated forces to said article carrier means and/or to said carrier mounting means to permit movement of said article carrier means from said predetermined position of predetermined alignment to a position displaced therefrom;
   (h) said carrier mounting means further upon removal of said generated forces automatically effecting movement of said article carrier means back to said predetermined position of predetermined alignment.

3. A guided vehicle; comprising:
   (a) vehicle body means;
   (b) article carrier means carried by said vehicle body means for relative movement with respect to said vehicle body means but so as to occupy a predetermined position of predetermined alignment with respect to said vehicle body means;
   (c) carrier mounting means mounting said article carrier means to said vehicle body means for said relative movement with respect to said vehicle body mean and so as to facilitate disposition of said article carrier means in said predetermined position of predetermined alignment;
   (d) said carrier mounting means including ball means including a predetermined number of ball transport means arranged in at least two parallel rows, each of said parallel rows being spaced from the other and including at least two of said ball transport means;
   (e) mounting means carried by said article carrier means for cooperation with said ball means;
   (f) limit means including a plurality of rod means carried by said vehicle body means and a plurality of openings each of a pretermined size and configuration and each carried by said article means for aligned disposition about one of said plurality of rod means such that relative movement of said article carrier means is limited by movement of an inner wall of at least one of said openings against an outer wall of its respective rod means; and (g) cap means carried by each of said rod means and for coaction with said article carrier means to limit vertical movement of said article carrier means with respect to said vehicle body means;

(h) said carrier mounting means being responsive to the application of generated forces to said article carrier means and/or to said carrier mounting means to permit movement of said article carrier means from said predetermined position of predetermined alignment to a position displaced therefrom;

(i) said carrier mounting means further upon removal of said generated forces automatically effecting movement of said article carrier means back to said predetermined position of predetermined alignment.

4. The guided vehicle of claim 3, wherein said carrier movement means includes a plurality of guide wheels carried by said article carrier means for disposition proximate side edges thereof and for coaction with guide means disposed at a location where the guided vehicle is to be positioned.

5. The guided vehicle of claim 4, wherein said guide means includes a pair of spaced guide rails spaced one from the other by a predetermined spacing sufficient to receive therebetween said article carrier means.

6. The guided vehicle of claim 5, wherein each of said guide rails includes a flared out entry portion and a substantially straight side portion.

7. The guided vehicle of claim 5, wherein said plurality of guide wheels includes a first predetermined number of entry guide wheels and a second predetermined number of side guide wheels; said entry guide wheels being of larger diameter than said side guide wheels.

8. A guided vehicle for cooperation with an article station having a vehicle receiving area for receiving the guided vehicle preferably along a predetermined vehicle path; comprising:

(a) vehicle body means;
(b) article carrier means carried by said vehicle body means for relative movement with respect to said vehicle body means but so as to occupy a predetermined position of predetermined alignment with respect to said vehicle body means;
(c) carrier mounting means mounting said article carrier means to said vehicle body means for said relative movement with respect to said vehicle body means and so as to facilitate disposition of said article carrier means in said predetermined position of predetermined alignment;
(d) vehicle moving means for moving said vehicle into and out from said vehicle receiving station along selected vehicle paths including said predetermined vehicle path;
(e) said article carrier means coacting with at least a predetermined portion of the article station, when the guided vehicle is moving along a selected vehicle path other than said predetermined vehicle path, to generate forces upon said article carrier means such that said article carrier means is moved with respect to said vehicle body means;
(f) said carrier mounting means being responsive to the application of said generated forces to said article carrier means to permit movement of said article carrier means with respect to said vehicle body means from said predetermined position of predetermined alignment to a position displaced therefrom;
(g) said carrier mounting means further upon removal of said generated forces upon movement of the guided vehicle from said vehicle receiving station automatically effecting movement of said article carrier means back to said predetermined position of predetermined alignment;
(h) said carrier mounting means including ball transport means carried by said vehicle body means at predetermined mounting means locations and mounting means carried by said article carrier means for cooperation with said ball transport means;
(i) said mounting means including a cone-like surface disposed for coaction with said ball transport means;
(j) limit means including at least one rod means carried by said vehicle body means and at least one opening of predetermined size and configuration formed in said article carrier means for disposition about said rod means such that relative movement of said article carrier means is limited by movement of an inner wall of said opening against an outer wall of said rod means; and
(k) cap means carried by each rod means and for coaction with said article means to limit vertical movement of said article carrier means with respect to said vehicle body means.

9. The guided vehicle of claim 8, wherein said article carrier means includes a plurality of guide wheels carried by said article carrier means for disposition proximate side edges thereof and for coaction with guide means disposed at the vehicle receiving station.

* * * * *